INVENTOR
SIDNEY METZGER
BY Percy P. Lantzy
ATTORNEY

INVENTOR
SIDNEY METZGER
BY Percy P. Lantzy
ATTORNEY

INVENTOR
SIDNEY METZGER
BY Percy P. Lantzy
ATTORNEY

United States Patent Office 2,832,827

Patented Apr. 29, 1958

2,832,827

SIGNAL LEVEL CODER

Sidney Metzger, Bergenfield, N. J., assignor to International Telephone and Telegraph Corporation, a corporation of Maryland Application October 2, 1952, Serial No. 312,685

11 Claims. (Cl. 178—43.5)

This invention relates to multichannel signal systems and more particularly to a signal level coding circuit employed in a pulse code modulation (PCM) system.

A type of coding circuit heretofore employed to code any modulating signal required that the modulating signal be employed to produce amplitude modulated pulses (PAM) which in turn produced width modulated pulses and hence were converted into a series of discrete pulses by the action of a timing frequency wave being applied to a gating device for the duration of the width modulated pulse. The number of one-half cycles or discrete pulses passed by the gating device were counted by five "scale of two" counters, the output of which constituted a channel code group. This coding system is an elementary system of counting, analogous to counting any number of units up to a predetermined number by counting one unit at a time.

In another type of PCM coder for transforming amplitude modulated pulses into groups of code pulses, the amplitude of the signal to be coded is successively compared with the amplitude of a number of different reference signals. The binary systems in which such coders are employed must determine according to the amplitude of the signal to be coded, or a subtractive residue deduced from said signal, whether it is larger or smaller than the amplitude of the reference signal and from this information a corresponding code pulse or the omission of a code pulse results. In some coders of this type the reference signal varies from counting stage to counting stage by powers of two and in order to allow this coding pulse to be performed, the amplitude of the signal to be coded is stored by some agency during the usual time necessary for the successive comparisons.

Another form of such a coder does away with the storing agency and provides a constant reference signal for all code elements, or coding stages. The circuitry of such codings comprise an electrical chain consisting of an electronic two stage comparator with the respective inputs and outputs in parallel and further having a delay line whose input is fed from the output of said comparator for delaying signals applied to its input by a time interval equal to the duration of a code element, followed by an auxiliary amplifier having an amplification factor of two, the output of which reapplies the thus treated signals to the input of said comparator. A second delay line having its input fed from the amplitude modulating pulses applied to the input of the comparator and delaying said pulses by a time interval equal to the duration of emission of a complete code group increased by an elementary interval equal to the duration of one code element, and an amplifier amplifying said delayed pulses to such a level that, combined with the signals applied to the input of the auxiliary amplifier, it gives a negative blocking signal for the stages of said comparator acting to limit the operation of the coding system to the number of operations necessary to produce the desired code from the modulating signal.

The last type of coding described and the coder herein disclosed may be considered analogous to the method employed in measuring a line with a ruler to say, the nearest ⅛ of an inch. In measuring the line it would be very laborious to count the number of ⅛ inches starting at one end of the ruler and working up to say, 29/8. Instead we read 3″ plus ½″ plus ⅛″ equals 29/8 inches. Therefore, we only "count" three numbers on the ruler, but we agree before hand as to the number of ⅛″ in each one of our "counts."

The present invention is related to the above type of coder or counting circuit in that a modulating signal for a particular channel may be recognized and coded in the minimum number of steps similar to the analogy drawn to measuring a line with a ruler. The circuitry employed herein is less complicated as compared to the prior art circuitry and not in any way limited to a binary system as are the above types of counting or coding circuits.

An object of this invention is to provide a simple coding circuit capable of comparing an amplitude modulated pulse to a predetermined reference voltage and producing in a minimum number of step a code group of any number of code digits or elements for any numbering base or code system, i. e. binary, ternary, decinary, etc., representing the amplitude variations of a modulating signal, each code element having a given weight dependent upon the numbering or code system employed and the number of code elements or digits employed in a code group.

Another object of this invention is to provide a simple coding circuit wherein the code groups represent the amplitude variations of an amplitude modulating signal with each code element in said code group having a given weight and a pulse amplitude which is proportional to the signal level input of the counting circuit.

Still another object of this invention is to provide a circuit which under certain circumstances produces a code group wherein each code element has a given weight and a constant amplitude.

A feature of this invention is a comparison circuit which may include a subtraction circuit wherein the level of an amplitude pulse is compared to a given reference voltage. If the signal level is greater than the reference voltage, a pulse having a predetermined amplitude is emitted from the comparator and the difference voltage is coupled to an amplifier wherein this difference voltage is multiplied by a factor equal to the base of the numbering system employed in the PCM system. This multiplied difference is then coupled to the next or succeeding stage having circuitry identical to the first counting stage wherein the steps of counting takes place in a similar manner. This process of comparison and multiplication continues in identical counting stages until the signal level of the modulating signal is completely coded in accordance with a desired type of PCM code, said type of code being binary, ternary, decinary, etc., having *n* digits or code elements in each code group.

Another feature of this invention is the employment of a gating device which is opened or activated when the level of an amplitude pulse is less than the reference voltage resulting in no pulse at the output of the comparison circuit. The gate couples this comparator input signal directly to the voltage multiplier and hence to the succeeding counting stage for recognition and coding of a modulating signal.

Still another feature of this invention is the incorporation of identical counting stages coupled together in series whereby the signal level may be completely recognized and coded pulses emitted of a predetermined code containing the modulating information for transmission by a radio link to a distant receiver for decoding by conventional decoding circuits in the case of a binary system, or in the case of other numbering systems by circuit arrangements which sum the products of the code element given weight times the code element pulse amplitude.

A further feature of this invention is the incorporation of a single counting stage whereby the signal level will be completely recognized in a minimum number of steps depending upon the code system employed, the multiplied output being fed back to the input of the counting stage through a delay device having a delay time of one baud or code element the required number of times for complete coding of the modulating signal.

The term "last stage" or "succeeding stage" as herein employed may refer to a counting system wherein a series of identical counting circuits are employed, or the term may signify a counting system wherein a single counting circuit is employed a predetermined number of times in the production of a single code group through a feedback arrangement wherein the multiplied signal is fed back to the input of the coding circuit in accordance with the principles of this invention.

The above-mentioned and other features and objects of this invention will become more apparent by reference to the following description taken in conjunction with the accompanying drawings, in which.

Figure 1:
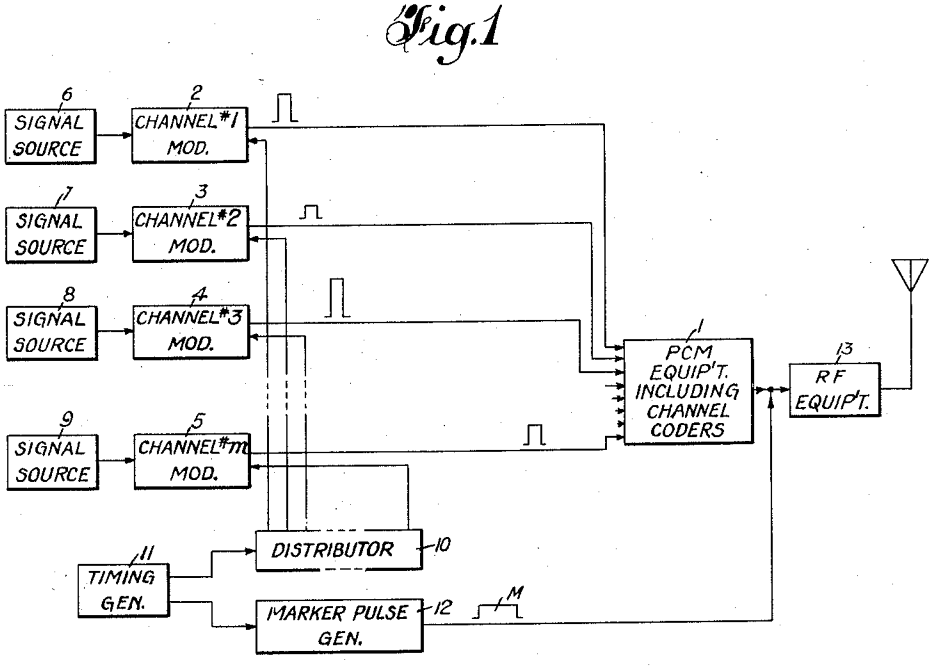
Fig. 1 is a block diagram of the transmitting portion of a PCM system adapted to incorporate the coding circuits of my invention.

Referring to Fig. 1, a block diagram of a typical PCM system is illustrated incorporating in the PCM equipment 1 a plurality of channel coding circuits in accordance with the principles of this invention. The PCM system comprises $m$ channel modulators, shown herein to be PAM modulators 2—5, deriving the modulating energy, respectively, from signal sourves 6—9. The PAM pulses emitting from modulators 2—5 are not a random affair, but are controlled in a time sequence by the action of pulses produced by distributor 10 which is energized from timing generator 11. Distributor 10 may comprise a delay line having a plurality of successive taps thereon wherein the outputs from the taps are delayed a predetermined time interval to activate the modulators successively in time to produce a PAM pulse for each channel representing the modulating signal with the output of each modulator delayed with respect to the preceding channel a time interval corresponding to the time interval between the taps of distributor 10. Timing generator 11 coincident with the activation of distributor 10 energizes marker pulse generator 12 to produce a reference pulse M which signifies time zero, or the start of a cycle with the PAM pulses of all channels being delayed a predetermined amount therefrom determined by the delay taps of distributor 10.

The marker pulse M is coupled to R.-F. equipment 13 for transmission to a distant unit or units of a PCM system, said units including a PCM repeater and/or receiver wherein the marker pulse M is employed to synchronize the repeater and/or receiver with the transmitter. The time delayed outputs of each channel modulator 2—5 are coupled to the PCM equipment 1 wherein each PAM channel signal is separately coded by its own coder circuit, still substantially maintaining the delay, with respect to the marker pulse, introduced into each channel by distributor 10. After the coding process of each channel, the coded signals are interleaved into a pulse train, each channel separated by the predetermined delay and delayed with respect to the marker pulse M for application to the R.-F. equipment 13 and transmission via a radio link to distant units of the PCM system.

Figure 2:
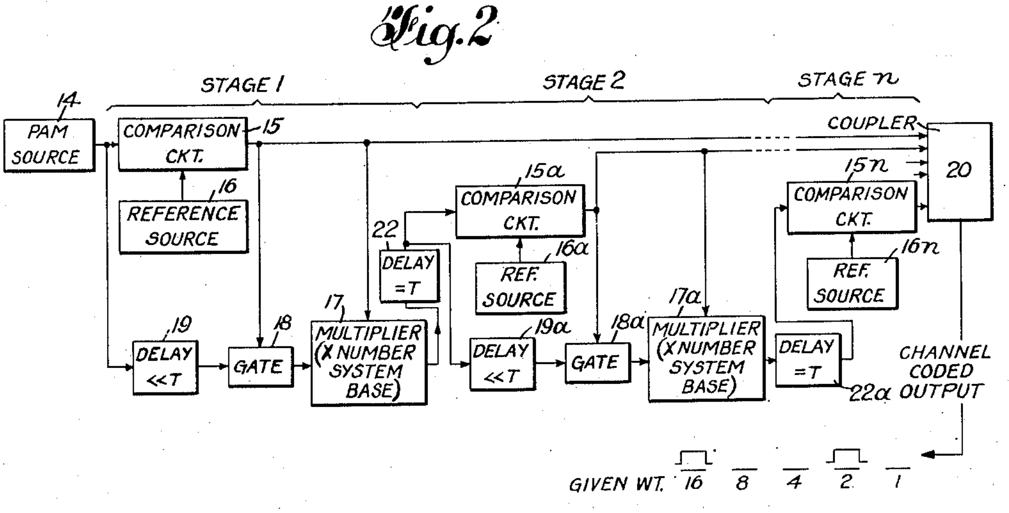
Fig. 2 is a block diagram of an embodiment of a single channel coder as employed in the PCM equipment of Fig. 1.

Referring to Fig. 2, a block diagram of an embodiment of a single channel coder as incorporated in the PCM equipment 1 is illustrated as receiving a PAM signal from signal source 14 which may comprise source 6 and modulator 2 of Fig. 1. The coder is shown to comprise a plurality of counting or coding stages wherein each stage except the last stage comprises a comparison circuit 15 which includes therein a subtraction circuit, a reference voltage source 16 to which the signal voltage or level of the PAM signal is compared, a multiplier 17 having a multiplying factor equal to any predetermined numbering system base, for example, two for a binary system, three for a ternary system, or ten for a decinary system, and a gate device 18 including a delay device 19 whereby a signal level less than the reference voltage may be coupled directly to multiplier 17 for multiplication thereof prior to being coupled to the next or succeeding stage through a device having a delay time (T) equal to one baud or code element. The last stage included in such a counting or coding circuit as herein illustrated need only comprise a comparison circuit 15$n$ and reference source 16$n$ since the functioning of the coder circuit in accordance with the principles of this invention requires that substantially no residue exist once the predetermined number of digits have been developed with no further multiplication taking place which halts the coding process. Thus, the signal level and reference volt produces an equivalence between the input signal level and the reference source producing a difference of zero at least in the last stage of the counting process. Therefore, there is substantially no difference voltage to be multiplied, thereby allowing the elimination of the units in the last stage corresponding to delay circuit 19, gate 18, and multiplier 17 of the first stage.

The code group produced by the coding circuits of my invention from the PAM signal of a single channel in a multichannel system may be expressed mathematically by the general function:

$$(1)\quad f(x)=a_0b^0+a_1b^1+a_2b^2+a_3b^3+\ldots a_ib^i+\ldots a_{n-1}b^{n-1}$$

where $b$ equals the base of a numbering system, for example, two for binary, three for ternary, etc., $a_i$ equals $b-1$, $b-2$, $b-3$, . . . 0, and $n$ equals the number of code elements employed in the coding system.

In the coding circuits of this invention it is possible to know the maximum value or number of levels a particular system may measure. This number of levels measurable by the coding circuit is a function of the number of code elements employed in a particular coding system and may be expressed generally for an $n$ code element system as follows:

$$(2)\quad \text{Max. number of levels}=1+\sum_{i=0}^{i=n-1}(b-1)b^i$$

Thus, examination of Equation 2 reveals that the maximum number of levels measurable by a coding circuit in accordance with this invention depends not only upon the number of code elements employed in a coding system, but also on the base of the coding system employed. Therefore, proper manipulation of Equation 2 would enable the determination of the numbering system having a certain number of code elements for employment with this type of coding circuit to meet certain predetermined requirements on the maximum value of a PAM signal to be measured by the circuit.

Having a particular numbering system and number of code elements in mind it is possible to determine from either of the above equations the given weight for each code element by solving for the various numerical values of $b^i$ in the mathematical series. Furthermore, for a particular coding system having a certain number of code elements it is possible to determine the number of counting stages where a series of counting stages are employed, or the number of cycles necessary for the complete coding operation where a single counting stage is employed with a feedback arrangement. The counting stages or cycles are equal to $n$ or the number of code elements. In some embodiments of this invention a number of constant current devices, such as a gas discharge device of the thyratron type or an electron discharge device of the pentode type, are employed in the comparator circuit of each counting stage having a successively increasing reference voltage applied thereto with the successive reference voltages a multiple of the reference voltage on the first device. The reference voltage on the first device is calculated by solving for the numerical value of $b^{n-1}$ while the number of devices in the comparison circuit of a counting stage is the numerical value of $a_i+b-1$ for a particular numbering or coding system having a predetermined number of code elements.

Specific examples of handling the mathematical functions and relationships hereinabove enumerated may prove beneficial at this time. Let the numbering system be binary having seven code elements. Then with $b=2$, $n=7$, and $a_i=1, 0$ from Equation 1 we have $$f(x)=1\times 2^0+1\times 2^1+1\times 2^2+1\times 2^3+1\times 2^4+1\times 2^5+1\times 2^6$$

giving the weights of the various code elements equal to 64, 32, 16, 8, 4, 2, and 1. As pointed out hereinabove the counting stages necessary to completely code a PAM signal employing a seven code element binary system number are seven and the maximum value of a PAM signal measurable by this system, as found in Equation 2 is 128 volts with the reference voltage equaling 64 volts. It would be possible to actually exceed this 128 volt PAM level limit as long as the proportion between the measurable limit and the reference voltage is maintained. Similarly all numerical values may be decreased, providing they stay in the same ratio. The number of devices employed in the comparison circuit of each counting stage for this type of coding system number one per stage. For a binary system the comparison circuit recognizes only the presence or absence of a pulse level greater than the reference level and an output of constant amplitude is produced each time the pulse level exceeds the reference level by means of a coupler circuit comprising a blocking oscillator type circuit.

Suppose, however, that rather than a binary system we employ a decinary system having three code elements. Then with $b=10$, $n=3$, and $a_i=9, 8, 7, 6, 5, 4, 3, 2, 1$, or 0 we have from Equation 1:

$$f(x)=a_0\times 10^0+a_1\times 10^1+a_2\times 10^2=a_0\times 1+a_1\times 10+a_2\times 100$$

To completely code a PAM signal it is necessary to employ only three counting stages which can handle a maximum signal level, as calculated from Equation 2 in the following manner, of a thousand.

$$\text{Number of levels}=1+\sum_{i=0}^{i=n-1} a_i 10^i=a_0 10^0+a_1 10^1+a_2 10^2$$
$$=1+9\times 1+9\times 10+9\times 100=1+999=1000$$

The number of constant current devices employed in the comparator is equal to $b-1$ or 9 and the reference voltage on the first device in equal to $b^2$ or 100 volts with each succeeding stage having a reference voltage which is a multiple of 100 volts, for example, on the second device a reference voltage of 200 volts, on the third device a reference voltage of 300 volts, etc. However, as stated hereinabove the actual voltage of a PAM signal may exceed or may be less than the 1000 volts level limit as long as the proportion between the maximum voltage and the reference voltage is maintained. The coded pulses or elements emitted from this type of coding circuit have a pulse amplitude proportional to the signal level or multiplied residue at the input of the counting stage, or the number of constant current devices caused to fire, such that the sum of the amplitude of the code element pulse times the given weight of the code element are equal to the amplitude of the PAM signal. Thus, in systems, other than binary, the coding circuit not only recognizes presence or absence of a pulse greater than a reference voltage but produces a code element pulse output proportional to the level of the approximate value of the input PAM signal or multiplied residue.

When the various embodiments are further described specific examples of pulse inputs and reference voltages will be employed by way of example to further illustrate the functioning of the various circuits, but the numbering system employed and the number of code elements in the coding system do not constitute a limitation on the application of the various embodiments. As illustrated by the above recited mathematical functions the coding circuits herein disclosed may be employed to code a PAM signal employing any possible combinations of numbering base and code elements.

Generally, the principle of operation of the signal level coder disclosed herein may be explained as follows with reference to Fig. 2. Assume for the sake of example that a binary system having five digits is employed. This means five counting stages are necessary to completely code the PAM signal, the reference voltage of source 16 should be proportional to 16 volts, the maximum signal level measurable should be proportional to 32 volts, and the number of devices in the comparison circuit is equal to one. Assume a signal level of 18 volts is coupled to comparison circuit 15 wherein the above level is compared to the reference voltage of 16 volts from source 16. Since the signal level is greater than the reference voltage a pulse is sent to coupler circuit 20 to form the first constant amplitude pulse of the code group having a given weight of 16. The difference voltage as produced by the subtraction circuit contained in comparison circuit 15 is 2 volts and is coupled to the multiplier 17 which has a multiplying factor for this example binary system of two. The multipled residue equals four and is presented to comparison circuit **15*a* of the second stage wherein the voltage level is again compared to the reference voltage. Since the level of the multiplied residue is less than the 16 volts of the reference source 16*a* no pulse will be emitted. Gate 18*a* recognizes the absence of an output pulse from circuit 15*a* and therefore opens to pass the four volt signal level to multiplier 17*a* through the delay device 19*a*, said delay device having delay time much less than a baud. The action of multiplier 17*a* is to raise the signal level by a multiplying factor of two producing a signal level of 8 volts for comparison in the comparator of the third stage (not shown), identical in structure to the preceeding stages. Again the signal level is less than the reference voltage allowing the gate to open since no output is emitted from the comparator. The multiplier in the third stage raises the level to 16 volts which equals the reference voltage of the reference source of the fourth stage (not shown). Due to the equivalence between signal level and reference level a pulse is emitted and applied to coupler 20 to produce a pulse output of constant amplitude for the fourth code element of the code group. The difference between the signal level and the reference level in the fourth stage is equal to 0 and as a result there is no signal level to be coupled to the last counting stage resulting in no output from comparator 15*n*** leaving a blank for the fifth code element.

Thus with a signal having a voltage level of 18 volts and employing the reference voltage as established by the mathematics of a binary system having five code elements the resulting coded output from coupler 20 results in a constant amplitude pulse for code element one having a weight 16, a blank for the second digit, a blank for the third code element, a constant amplitude pulse having a given weight of two for the fourth code element, and a blank for the fifth digit. Therefore, the sum of the product of the code element pulse amplitudes times the given weight equals an 18 volts signal, the level of the PAM signal applied thereto for coding.

Figure 3:
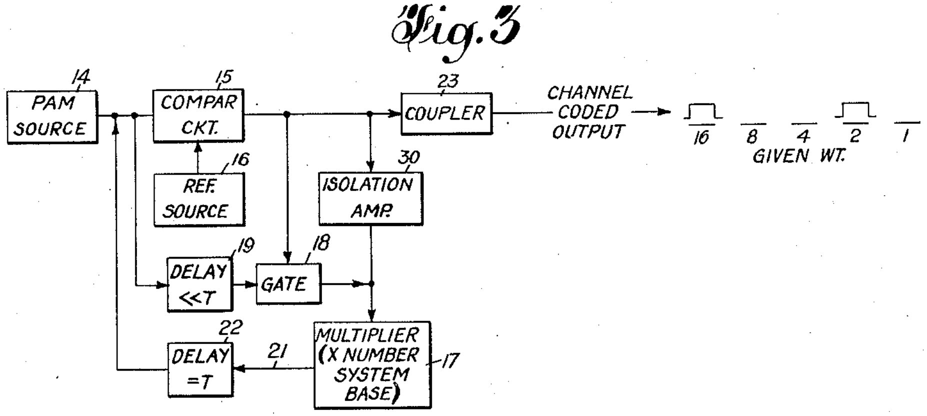
Fig. 3 is a block diagram of another embodiment of this invention.

It must be remembered that the term "next stage" or "succeeding stage" as herein employed may refer to a single counting stage as illustrated in the first stage of Fig. 2 having a feedback arrangement from the multiplier output to the input of the comparator as shown in Fig. 3. The blocks of the counting stage of Fig. 3 have reference characters identical with the blocks of the first counting stage of Fig. 2 which is intended to illustrate an identical structure and function wherein the numbering base and number of code elements in the counting or coding system are identical. The circuit of Fig. 3 employs the same basic circuit components as illustrated in the first stage of Fig. 2 with the addition of feedback path 21 including a delay device 22 wherein the delay time is equal to a PCM baud (T) and an isolation amplifier 30 for preventing false coding when the signal level is less than the reference level and gate 18 is opened.

Thus, to completely code the signal of 18 volts employing the circuit of Fig. 3 where a reference voltage of 16 volts is employed, as in Fig. 2, five cycles of operation are required. In other words the multiplied output from multiplier 17 is fed to the input of comparator 15 four distinct times allowing comparator 15 and its associated circuitry to function five times in a manner substantially the same as in Fig. 2. In the operation of completely coding the PAM signal from source 14 employing this feedback arrangement, the presence or absence of a pulse corresponding to a code element, each code element assigned in time to a distinct baud, is coupled to coupler 23 with the code group being established as in Fig. 2.

Figure 4:
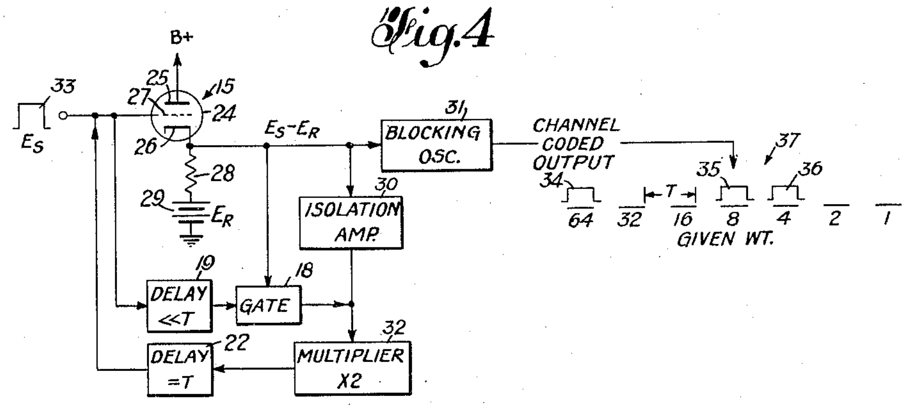
Fig. 4 is a schematic and block diagram of an embodiment in accordance with Fig. 3.

Fig. 4 illustrates schematically the comparison circuit in conjunction with the corresponding blocks of the embodiment of this invention, as shown in Fig. 3, wherein the coding of a PAM signal is accomplished in a single stage incorporating the hereinabove described feedback arrangement. The comparison circuit 15 includes an electron discharge device 24 having at least an anode 25, a cathode 26, and a control grid 27, and a resistor 28, said resistor 28 and said device 24 arranged as a cathode follower type of circuit. The reference source 16 comprising battery 29, or any other suitable D.-C. voltage source, along with resistor 28 are included in the cathode circuit of device 24 to function as a subtractive circuit and also provides a means for developing an output voltage from the comparison circuit 15, said output preferably being the difference between the signal level and the reference level. An isolation amplifier 30 having a gain substantially equal to one is provided between the output of device 24 and the gate 18 so that when gate 18 is open to pass a signal voltage less than the reference voltage for direct multiplication a false code element pulse will not be produced by the possible indiscriminate keying of blocking oscillator 31, employed in this embodiment as coupler 23.

Blocking oscillator 31 is employed herein to provide code element pulses having a constant amplitude when the signal level is greater than or equal to the reference level producing an output from circuit 15 to activate oscillator 31. Further, the coding circuit of this embodiment illustrates a multiplier 32 which multiplies the difference voltage, or the direct signal voltage from gate 18 by a factor of two with this multiplied voltage being coupled to grid 27 by means of delay device 22 incorporating a delay time of one baud (T). Such an embodiment is provided specifically for operation in a binary PCM system which employs only one counting stage and a feedback arrangement to properly code a PAM signal. It should be remembered that the employment of the feedback arrangement is not limited to a binary system, it may be employed in any desired counting or coding system and the multiplying factor incorporated therewith may have any value depending upon the coding system being employed in a PCM multichannel transmitting system.

A specific example will be employed with connection of Fig. 4 for the purpose of indicating generally the principles of the counting or coding operation and in particular the operation of this embodiment for a binary system having seven code elements. Employing the mathematical functions hereinabove expounded, the maximum measurable level is proportional to 128 volts, the reference voltage from source 29 is proportional to 64 volts, and the number of counting cycles is equal to seven. Assume a signal pulse 33 having a level equal to 76 volts. Since 76 volts is greater than 64 volts device 24 conducts producing an output therefrom substantially equal to (76−64) or 12 volts which keys oscillator 31 to produce the code element pulse 34 having a constant amplitude and a given weight of sixty-four. The difference of 12 volts is coupled to gate 18 and amplifier 30. Gate 18 recognizes that a pulse has been sent and remains closed while amplifier 30 couples the difference voltage to multiplier 32 wherein the difference level is raised by a multiplying factor of 2 to 24 volts. The 24 volts output from multiplier 32 is then coupled to grid 27 by means of delay device 22. The 24 volts level is compared to the reference voltage of source 28 and is recognized to be less than the 64 volt reference. There is no output sent from comparator 15, the absence of which is recognized by gate 18, thereby being activated to allow the 24 volts to be coupled directly to multiplier 32 through delay device 19, the time delay of device 19 being adjusted to a sufficient length allowing a coincident operation of the device 19 after the recognition of no output pulse from comparator 15. The voltage level is raised to 48 volts and applied again to grid 27 for comparison to the reference source in comparator 15. Since 48 volts is still less than 64 volts no output to oscillator 31 results, and the 48 volt signal is again fed directly to multiplier 32 by the output gate 18 and device 19 as hereinabove described. The application of the multiplied signal, having a level of 96 volts, to grid 27 causes device 24 to conduct providing an output from comparator 15 and activation of oscillator 31, resulting in a constant amplitude pulse 35 having a given weight of eight.

Where no output results from comparator 15 and the multiplied residue is fed through delay device 22 for comparison a blank occurs in the output from oscillator 31 corresponding to that particular baud. In this example, the blanks thus far have occurred in bauds two and three having respective given weights of thirty-two and sixteen. Continuing the counting cycle, the difference voltage causing the output of code element pulse 35 is raised to 64 volts by multiplier 32 and is again compared to the reference voltage in comparator 15. This multiplied residue is equal to the 64 volt reference and causes conduction of device 24 for triggering oscillator 31 and producing therefrom pulse 36 having a constant amplitude and a given weight of four. The difference voltage applied to multiplier 32 is substantially zero and thereby two further blanks for the last two baud result completing the code group. Since the coder of this invention is employed in a PCM system activated by a PAM signal controlled in time with respect to a marker pulse, as hereinabove described in connection with Fig. 1, and the time allotted to each channel of the multichannel system is proportioned between the code elements or bauds of a code group, it is unnecessary to provide means to stop operation of the coder if the principles hereinabove set down are followed which will provide a difference of zero at least during the forming of the last code element of a code group.

The code group 37 corresponds to the amplitude of the pulse 33 the level of which may be obtained by multiplying the amplitude of each of the code element pulses by its corresponding given weight and then summing these products. Thus, for the example herein employed, we have $64\times1+8\times1+4\times1=76$ volts. Conventional PCM decoders of the binary type which may be employed at a distant receiver does not recognize how the code group was formed, but will operate on the code group to recover the amplitude of 76 volts by recognizing constant amplitude pulses being present in various code element bauds, said bauds having the predetermined weights as illustrated for the examples employed in connection with Figs. 2, 3, and 4.

Figure 5:
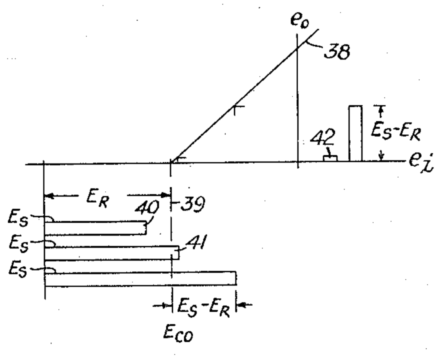
Fig. 5 is a graphical representation of the operation of the embodiments of Figs. 3 and 4.

Fig. 5 illustrates graphically the theoretical voltage output versus voltage input characteristics 38 of device 24 under different conditions of the signal output. $E_b$, the anode supply voltage in conjunction with $E_r$, the reference voltage, establishes the cut-off of device 24 and is indicated by line 39. A signal input pulse, such as pulse 40, having an amplitude that is not sufficient to exceed line 39, does not cause device 24 to conduct and therefore, there is no output. However, a signal pulse, such as pulse 41, which extends the cut-off line 23 causes an output from device 24 as represented by pulse 42. The electron discharge device employed to compare signal levels in the embodiments described may be any commercial type having substantially a characteristic similar to that illustrated by the theoretical characteristic 22.

Figure 6:
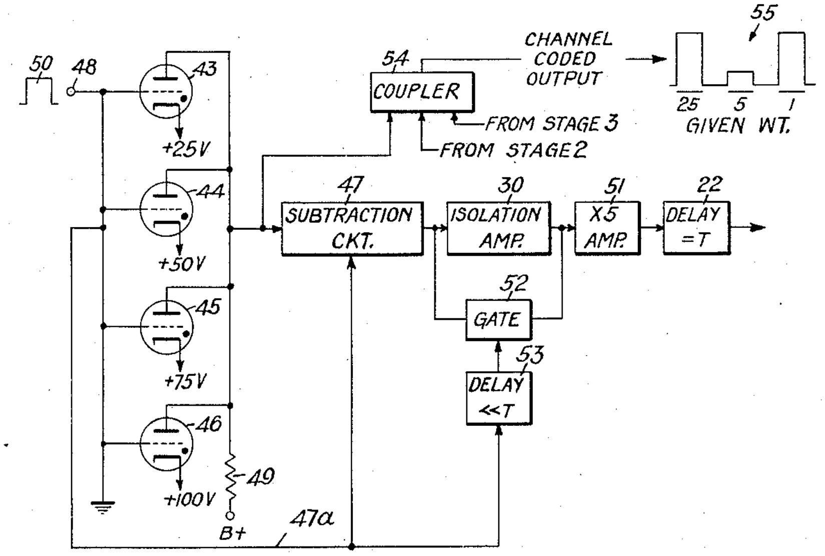
Fig. 6 illustrates a schematic and block diagram of another embodiment of this invention.

Referring to Fig. 6, a portion of an embodiment is illustrated which includes three identical portions in series substantially as shown in Fig. 2. The circuitry and reference voltages are shown by way of example for a coding system having a numbering base of five and consisting of three code elements. The mathematical functions indicate that four devices should be employed in the comparator, the maximum measurable level is proportional to 125 volts, the reference voltage on the first device is proportional to 25 volts, and the difference between the reference voltages on the successive devices is proportional to 25 volts. Each portion includes, for this example, four gaseous discharge devices 43–46, or may include electron discharge devices of the constant current pentode type, connected in parallel with respect to the input signal applied to the respective control grids and also with respect to the output at the respective anodes. The anode circuit is in turn coupled to a conventional subtraction circuit 47 wherein the combined output of devices 43–46 are subtracted from the input signal at terminal 48, if the input signal is greater than the reference voltage on the device 43, said input signals being coupled to the subtraction circuit 47 by means of conductor 47*a*. Thus, devices 43–46 and circuit 47 constitute the comparison circuit 15 of Fig. 2. The devices 43–46 are biased successively in steps of 25 volts with the reference voltage of device 43 being 25 volts, as per the numerical results of the enumerated mathematical functions. The reference voltages on the various devices, the anode load 49, and the anode supply voltage connected thereto are so arranged along with the actual characteristic of said devices that any voltage level high enough to cause a device to conduct produces only enough current for flow in the load to provide a voltage corresponding to the reference voltage of the last tube caused to conduct, each device caused to conduct contributing an equal share of current for flow through the load 49. Let us assume a signal level of 109 volts as represented by pulse 50. Under the influence of pulse 50, the devices 43–46 would conduct indicating a signal greater than 100 volts, but less than the measurable limit. The conduction of devices 43–46 sets up a D.-C. voltage in the anode load circuit of exactly 100 volts, while, the pulse 50 is conducted to circuit 47 which registers the exact value of the input pulse, for example, by means of a charging condenser. The approximation signal across the load 49 is coupled to the coupler or amplitude detector 54 for production of a code element pulse proportional in amplitude to the number of tubes fired and is also coupled to the circuit 47 from which a difference output of 9 volts is obtained. The difference signal is then amplified exactly five times by employing a negative feedback amplifier 51 with sufficient feed back so that the gain is independent of tube variations. Gate 52 and delay device 53 are provided for that particular situation where the signal level is less than the reference voltage on the first electron discharge device 43. The operation of this segment of the circuitry is similar in operation to the same segment employed in and discussed in connection with the embodiments of Fig. 2, 3, and 4. The difference voltage of 9 volts at the output of circuit 47 is now increased to 45 volts by amplifier 51 and is fed to a second stage identical with the portion shown in Fig. 6. The 45 volt signal causes the first device to conduct and the 25 volts produced across the common load of the second stage, similar to load 49 of stage 1, is subtracted from 45 volt input as before producing a difference voltage of 20 volts. An amplifier similar to amplifier 51 increases the difference voltage to 100 volts for application to a third portion or counting stage identical to the stage illustrated in Fig. 6. This signal will cause the four devices to conduct producing an approximation signal of 100 volts for subtraction from the multiplied residue applied to the input of this coding stage equal also to 100 volts resulting in a difference of zero, and bringing the cycle of operating to an end, and readying the circuit for a succeeding PAM signal on the next cycle of channel modulation.

As in previous embodiments each code element or baud of a code group has a given weight dependent upon the numbering base and the number of code elements in the coding system, therefore, the coupler 54 employed in an embodiment of this type "records" the number of tubes fired in each portion by means of a pulse amplitude detector or by some other suitable recorder. The first code element pulse of this illustrative example gives the number of "twenty-fives" in the signal the second digit pulse gives the number of "fives," and the next digit pulse gives the number of "units," as illustrated in code group 55. Therefore, our end result would be 109 volts, the summation of the product—amplitude times the given weight—of each individual code element, and we now have to only transmit by some conventional means three numbers varying between zero and four in steps of one rather than a complex signal possibly containing 109 levels counted one at a time. At the receiver this type of system lends itself nicely to simplification. The circuitry may be arranged such that the first code element pulse sets up a D.-C. voltage times twenty-five, the second digit pulse adds to this a D.-C. voltage times five, and the last digit pulse adds to this a D. C. voltage times unity.

Figure 7:
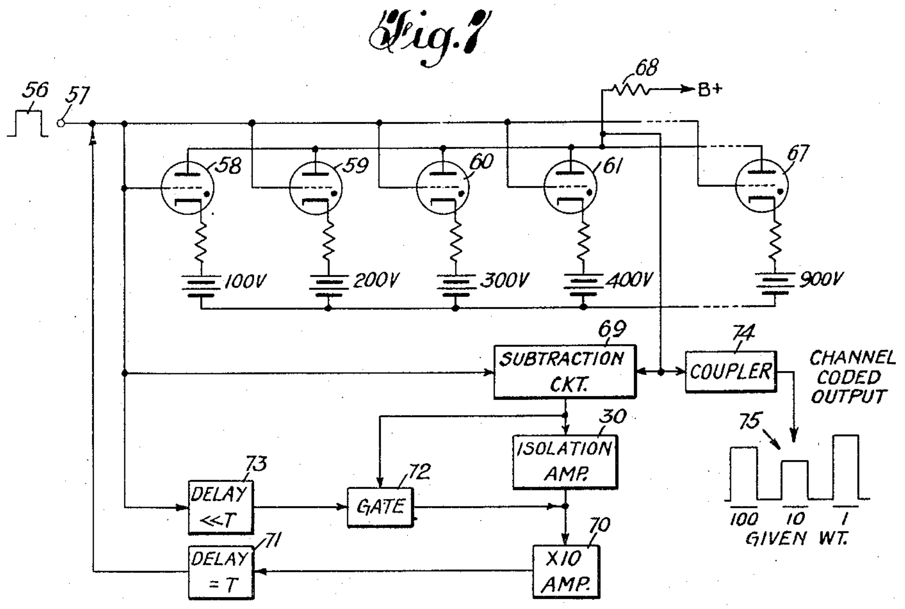
Fig. 7 is a schematic and block diagram illustrating still another embodiment of this invention.

Fig. 7 illustrates a further embodiment wherein it is possible to code a signal having a maximum measurable limit of 1000 levels employing the same portion of circuitry over and over again to accomplish the required counting in three steps rather than in a 1000 steps. To accomplish this a decinary system, base 10, having three code elements is employed. The circuitry employed is similar to that shown in Fig. 6 for the comparison circuit in that a plurality of devices are employed in the comparison circuit, nine such devices for this illustrative example, and also similar to that shown in Figs. 3 and 4 wherein a feedback path to the input of the comparison circuit from the output of the multiplier is utilized enabling the employment of a single counting stage to perform the coding operation in accordance with the principles of this invention.

The input signal represented by pulse 56 is applied to terminal 57 which leads to the control grids of constant current electron discharge devices or thyratron type gaseous discharge devices 58–67 connected in parallel. The anode circuits of devices 58–67 are further connected in parallel with respect to a common load resistor 68. In the cathode circuit of each device, for this particular illustrative example, is located a reference voltage progressively increased from 100 to 900 volts in steps of 100 volts. When an output occurs it is subtracted from the input signal at terminal 57 by subtraction circuit 69 which couples this difference voltage to multiplier 70, shown herein to be a decimal amplifier. The multiplied residue is then coupled to the input of the devices 58–67 by means of delay device 71 having a delay time of one PCM baud. The counting or coding circuit of this embodiment is also provided with a gate 72 and its accompanying delay device 73 to provide a means for counting or coding a signal level which is less than the 100 volts reference source applied to device 58.

Assume pulse 56 has an amplitude of 436 volts, the embodiment under discussion operates as follows. The first four devices will fire indicating a signal level between 400 and 500 volts which immediately provides an approximation signal of 400 volts for application to coupler 74. This 400 volt signal is further coupled to circuit 69 where it is subtracted from the input signal level of 436 volts. A difference voltage of 36 volts is coupled to amplifier 70 wherein the difference signal level is raised to 360 volts. Through delay device 71 the 360 volt signal is coupled to terminal 57 causing the first three devices 58–60 to fire. An approximation pulse having a level of 300 volts is conducted to coupler 74 and further coupled to circuit 69 for subtraction. The difference signal is again multiplied by a factor of ten and fed to terminal 57 through delay device 71. This signal of 600 volts causes the first six devices to fire resulting in a 600 volt approximation signal for presentation to coupler 64 and a zero difference voltage presented to circuit 69 ending the counting coding process for this particular PAM signal. During the three counting cycles each time a certain number of tubes fired, gate 72 would recognize the presence of an output to coupler 74. However, if the signal level had been such that no output could occur gate 72 woulld have opened and applied the input signal directly to amplifier 70 for multiplication and the start of a new coding cycle.

Coupler 74 of Fig. 7 is similar to coupler 54 of Fig. 6 in that it "records" the number of tubes fired in each counting cycle producing a code group 75 at the output thereof for application to the R.-F. equipment for transmission of the coded information of this particular channel to a distant multichannel receiver for decoding. The first code element pulse of this illustrative example gives the number of "hundreds" in the signal, the second code element pulse gives the number of "tens" in the signal, and the third code element pulse gives the number of "units," producing an end result of 436 volts, the sum of the product-amplitude times the given weight of each individual code element of a code group. The decoding portion of a distant receiving circuit may be arranged to utilize this code element product to recover the amplitude of the original PAM channel signal.

The embodiments disclosed herein have had reference to binary, quinary, and decinary coding systems having various numbers of code elements, however, the principles of this invention are not restricted to these coding or numbering systems nor are the reference voltages indicated herein restricted to these values. Any reference voltage and any numbering base having a predetermined number of code elements may be employed using the principles of this invention provided that the value of reference voltages, numbering base, and code elements are chosen properly with respect to each other as set forth by the mathematical relationships enumerated herein. Therefore, it is to be clearly understood that this description is made only by way of example and not as a limitation to the scope of my invention as set forth in the objects thereof and in the accompanying claims.

I claim:

1. In a pulse communication transmitting system of the character described, a channel coding means to represent the amplitude of an applied pulse amplitude modulated signal by a code group of pulses, said code group having a given number of predetermined weight code elements depending upon the base of the numbering system employed comprising a plurality of subtraction type counting stages equal to the number of code elements in said code group and a coupler means coupled to the outputs of said counting stages to deliver at the output thereof pulses representing the code elements of said code group, each of said plurality of counting stages including a reference voltage source, a comparison means for comparing the level of said message signal to the level of said reference source, an amplifier coupled to the output of said comparison means having a gain equal to the base of the numbering system for multiplying the difference between the level of said message signal and said reference source provided the level of said message signal is greater than the level of said reference source, a gating means for coupling the input signal to said comparison means directly to said amplifier when the level of said input signal is less than the level of said reference source, and a coupling means associated with the output of said amplifier for coupling the multiplied residue to the succeeding stage for continuation of the coding process.

2. In a communication system according to claim 1, wherein said plurality of counting stages comprise a series arrangement of identical counting stages, each stage responsible for the formation of a corresponding code element pulse for said code group.

3. In a communication system according to claim 1, wherein said plurality of counting stages comprise a single counting stage and a feedback path wherein said single counting stage is employed a plurality of times to form the requisite number of code element pulses for said code group.

4. In a communication system according to claim 3, wherein said feedback path includes a delay device having a delay time equal to the duration of one code element.

5. In a communication system according to claim 1, wherein said comparison means comprises a subtraction means and a number of normally inoperative constant current discharge devices equal to the base of the numbering system minus one having at least an anode, a cathode, and a control grid, said cathode being associated with said reference source in a manner to bias said device below cut-off a predetermined amount, and said subtraction means being associated with said devices to produce a residue signal equal to the difference between the input signal to said comparison means and the signal of said reference source when said input signal is greater than said reference source.

6. In a communication system according to claim 5, wherein said comparison means comprises a single normally inoperative constant current discharge device and a resistive means arranged as a cathode follower type circuit, said resistive means and said reference source cooperating to form said subtraction means and producing an output therefrom equal to the difference between the level of said message signal and the level of said reference source.

7. In a communication system according to claim 5, wherein said comparison means comprises a plurality of said discharge devices having parallel connected input control grids and parallel connected anodes, a common load impedance connected to said anodes to produce a common output equal to the voltage developed by the equal distribution of current flowing from the firing of said devices, and said subtraction means coupled to said load impedance and said control grids to enable subtraction of the output across said load impedance from the level of the signal input.

8. In a communication system according to claim 1, wherein said gating means comprises a gate device and a delay circuit having a delay time much less than the time duration of one code element.

9. In a communication system according to claim 1, wherein said coupling means comprises a delay device having a delay time equal to the time duration of one code element for coupling the output of said amplifier to the input of said comparison means where a single counting stage is employed a plurality of times to code said message signal.

10. In a communication system according to claim 1, wherein said coupler means comprises a blocking oscillator type circuit to produce said code element pulses having a constant amplitude when the base of the numbering system is equal to two.

11. In a communication system according to claim 1, wherein said coupler means comprises an amplitude detecting device to produce said code element pulses having varying amplitudes when the base of the numbering system is equal to three or more.

References Cited in the file of this patent

UNITED STATES PATENTS 2,660,618 Agrain ---------------- Nov. 24, 1953

OTHER REFERENCES

Bell Monograph, B–1611 (pages 1–4).

Bell Monograph, B–1518 (page 17).